(12) United States Patent
Yasuda et al.

(10) Patent No.: US 7,854,905 B2
(45) Date of Patent: Dec. 21, 2010

(54) HOLDING MATERIAL FOR POLLUTION CONTROL ELEMENT AND POLLUTION CONTROL APPARATUS

(75) Inventors: Daigo Yasuda, Hachioji (JP); Muneki Miyasaka, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/066,221

(22) PCT Filed: Sep. 5, 2006

(86) PCT No.: PCT/US2006/034378
§ 371 (c)(1),
(2), (4) Date: Jul. 30, 2008

(87) PCT Pub. No.: WO2007/030410
PCT Pub. Date: Mar. 15, 2007

(65) Prior Publication Data
US 2009/0025377 A1    Jan. 29, 2009

Related U.S. Application Data

(60) Provisional application No. 60/715,302, filed on Sep. 8, 2005.

(51) Int. Cl.
*B01D 50/00* (2006.01)
(52) U.S. Cl. ...................................... 422/179
(58) Field of Classification Search ............. 422/168, 422/177, 179, 180; 428/87, 105, 323; 29/890
See application file for complete search history.

(56) References Cited

U.S. PATENT DOCUMENTS

| | | | |
|---|---|---|---|
| 3,224,927 A | 12/1965 | Brown et al. |
| 3,313,737 A | 4/1967 | Brinsmead et al. |
| 3,441,381 A | 4/1969 | Keith et al. |
| RE27,747 E | 9/1973 | Johnson |
| 3,771,967 A | 11/1973 | Nowak |
| 3,798,006 A | 3/1974 | Balluff |
| 3,861,881 A | 1/1975 | Nowak |
| 4,204,907 A | 5/1980 | Korklan et al. |

(Continued)

FOREIGN PATENT DOCUMENTS

EP    1 418 317    5/2004

(Continued)

OTHER PUBLICATIONS

Hawley's Condensed Chemical Dictionary, 12$^{th}$ Edition, New York, 1993.

(Continued)

*Primary Examiner*—Tom Duong
(74) *Attorney, Agent, or Firm*—Harold C. Knecht, III

(57) ABSTRACT

A holding material (2) for mounting a pollution control element (1) in a pollution control apparatus (10) that provides for a high friction coefficient with the casing (4) and/or the pollution control element and can hold the pollution control element with good stability. The holding material comprises a fiber material (e.g., in the form of a mat) having a thickness and being provided with a friction layer (3) comprising inorganic colloidal particles (5) on an outer peripheral surface and/or an inner peripheral surface of the fiber material.

20 Claims, 8 Drawing Sheets

U.S. PATENT DOCUMENTS

| | | | |
|---|---|---|---|
| 5,250,269 A | 10/1993 | Langer et al. | |
| 5,955,177 A | 9/1999 | Sanocki et al. | |
| 6,025,455 A | 2/2000 | Yoshitake et al. | |
| 6,051,193 A | 4/2000 | Langer et al. | |
| 6,444,600 B1 | 9/2003 | Baek et al. | |
| 6,960,386 B2 | 11/2005 | Agata | |
| 2002/0127154 A1 | 9/2002 | Foster et al. | |
| 2003/0129102 A1 | 7/2003 | Turek et al. | |
| 2004/0097600 A1 | 5/2004 | Greenwood et al. | |
| 2006/0008395 A1 | 1/2006 | Ten Eyck et al. | |
| 2007/0084171 A1 | 4/2007 | Kaneko | |

FOREIGN PATENT DOCUMENTS

| | | |
|---|---|---|
| JP | 58-152086 | 9/1983 |
| JP | 04-281068 | 10/1992 |
| JP | 2001-259438 | 9/2001 |
| JP | 2002-206421 | 7/2002 |
| WO | WO 99/39086 | 8/1999 |
| WO | WO 2005/021945 A1 | 3/2005 |
| WO | WO 2007/030410 | 3/2007 |

OTHER PUBLICATIONS

Colloidal Silica Fundamentals and Applications, "Applications of Colloidal Silica: Present, and Future", Charles C. Payne, Taylor & Francis Group, 2006, pp. 714-719.

Fiberfax® Ceramic Fiber Product Specification, Unifrax, Niagara Falls, NY, 1996.

HOLDING MATERIAL FOR POLLUTION CONTROL ELEMENT AND POLLUTION CONTROL APPARATUS

CROSS REFERENCE TO RELATED APPLICATIONS

This application is a national stage filing under 35 U.S.C. 371 of the International Patent Application No. PCT/US2006/034378, filed Sep. 5, 2006, which claims priority to U.S. Provisional Application No. 60/715,302, filed Sep. 8, 2005, the disclosure of which is incorporated by reference in its/their entirety herein.

FIELD OF THE INVENTION

The present invention relates to a mounting or holding material (e.g., in mat form) for a pollution control element, and more particularly to a mounting or holding material for a pollution control element such as a catalyst carrier or a filter element. The present invention also relates to a pollution control apparatus comprising the holding material for a pollution control element, more specifically to a catalytic converter having a catalyst carrier holding material loaded therein or an exhaust gas purification apparatus (e.g., diesel engine exhaust filter) comprising a filter element holding material.

BACKGROUND

Exhaust gas purification systems using ceramic catalytic converters are well known as means for removing carbon monoxide (CO), hydrocarbons (HC), and nitrogen oxides ($NO_x$) contained in exhaust gases from automobile engines. Ceramic catalytic converters basically accommodate, for example, a honeycomb-shaped ceramic catalyst carrier (also referred to as "catalyst element") inside a metal casing, in other words, a housing.

It is well known that there are ceramic catalytic converters of a variety of types, but usually a configuration is employed in which a gap between a casing and a catalyst carrier accommodated therein is filled with a holding or mounting material (e.g., in the form of a mat) generally obtained by combining inorganic fibers with a liquid or paste-like organic binder. As a result, the mounting material filling the gap holds the catalyst carrier and can prevent mechanical shocks caused by impacts, vibrations, and the like from being unintentionally applied to the catalyst carrier. Accordingly, no fracture or movement of the catalyst carrier occurs in catalytic converters of such a configuration. Therefore, the desired action can be implemented over a long period. Furthermore, the above-described mounting material has a thermally insulating function as well as a holding function.

When a pollution control element (e.g., a catalyst carrier) is loaded into a casing, a pressure insertion system is generally employed such that a mounting or holding material is wound about the outer periphery of the pollution control element and integrated therewith and the integrated body is thereafter inserted under a pressure into a cylindrical casing. Pollution control element holding materials of various types have been suggested to improve productivity of loading (also called "canning") of the pollution control element in pressure insertion systems, increase cushioning ability (bulkiness) of the holding material, and prevent inorganic fibers constituting the holding material from being scattered in the air. See for example, Japanese Patent No. JP-A-2001-259438 claims, which suggests a catalytic converter comprising a catalyst carrier, a metallic shell (casing) covering the outer periphery of the catalyst carrier, and a holding and sealing material disposed between the catalyst carrier and the casing. In the case of this catalytic converter, the holding and sealing material, which corresponds to the holding material as referred to herein, comprises an inorganic fiber mat subjected to needle punching in the density of 50 to 3000 per 100 $cm^2$ has a content of organic component largely over 0 and not more than 2 wt. %, and generates a surface pressure of 5 to 500 kPa when heated to a temperature of 300 to 1000° C. at a filling density of 0.15 to 0.45 $g/cm^3$.

Furthermore, see for example Japanese Patent No. JP-A-2002-4848 claims, which suggests a catalyst carrier holding material used in a catalytic converter of a configuration similar to that described hereinabove, wherein a binder of 0.5 to 20 weight % of an organic binder or an inorganic binder is added and attached to a mat-like material with a mat-like arrangement of inorganic fibers, the filling density after assembling is adjusted so as to be within a range of 0.1 to 0.6 $g/cm^3$, and when the ratio of solids in the binder added and applied to the mat-like material is evaluated for three equal sections (upper section, medium section, and lower section) in the thickness direction, the ratio of solids in the binder in the upper section and lower section is higher than that in the medium section.

Furthermore, see for example Japanese Patent No. JP-A-2002-206421 claims, which suggests a holding sealing material for a catalytic converter comprising ceramic fibers assembled into a mat-like configuration as constituent elements and disposed in a gap between a catalyst carrier and a metal shell covering the outer periphery of the catalyst carrier, wherein a peak-and-valley structure composed of an inorganic substance is provided on the outer surface of the ceramic fibers. In this holding sealing material, the peak-and-valley structure composed of an inorganic substance preferably comprises metal oxide particles having a mean particle size of 50 to 1,000 nm.

SUMMARY OF THE INVENTION

However, for example, as described in Japanese Patent No. JP-A-2002-206421, when the surface of ceramic fibers constituting the catalyst carrier holding material is provided with a peak-and-valley structure by causing metal oxide particles to adhere thereto, a method of coating a suspension of metal oxide particles on the surface of ceramic fibers and then firing at a high temperature is used. Therefore, bridges linking the ceramic fibers together are formed or the slipping between the ceramic fibers is degraded, thereby hardening the holding material. As a result, there is a risk of the holding material cracking during assembling or productivity might decrease when the holding material is wound on the catalyst carrier. Furthermore, because the process of firing at a high temperature is involved, the working process is made complex and the production cost is increased.

The present invention resolves one or more of the above-described and other problems and provides a mounting or holding material effective in mounting pollution control elements such as catalyst carriers and filter elements.

It is an object of the present invention to provide a catalyst carrier holding material, or a holding material for other pollution control elements, that can excel in heat resistance, surface pressure holding ability, exhaust gas erosion resistance, and operability, makes it possible to avoid separation and displacement of a pollution control element (e.g., catalyst carrier) or a casing and the holding material when the holding material wound about and holding the pollution control element is press fitted into the casing of a pollution control apparatus (e.g., catalytic converter), and can hold the pollution control element, without moving it, after the pollution control element was loaded into the casing.

It is another object of the present invention to provide a pollution control apparatus that comprises this mounting or holding material for a pollution control element, and more particularly a catalytic converter having the catalyst carrier holding material loaded therein or an exhaust gas purification apparatus comprising a holding material for a filter element.

As a result of a comprehensive study conducted to resolve the above-described problems in the prior art, the present inventors have found that characteristics required for a catalyst carrier holding material, or other pollution control element holding material, can be realized without complicating the manufacturing process by using the holding material in a compressed state thereof and by disposing specific fine particles, by a unique method of the present invention, on the surface of the holding material, that is, on the surface of contact with the catalyst carrier and/or on the surface of contact with the casing, and this finding led to the creation of the present invention. These specific fine particles are of the type that are capable of increasing the coefficient of friction between (a) the holding or mounting material and the pollution control element (e.g., catalyst carrier) and/or (b) the holding or mounting material and the casing.

The present invention, in accordance with one aspect thereof, provides a holding or mounting material for a pollution control element that is to be wound about and hold a pollution control element inside a casing, is disposed between the casing and the pollution control element, and comprises a fiber material, preferably in the form of a mat, having a thickness. The holding material is disposed between the casing and the pollution control element under a constant compressive force applied thereto and is provided with a friction layer comprising inorganic colloidal particles on the outer peripheral surface of the holding material on the side of the casing and/or on the inner peripheral surface of the holding material on the side of the pollution control element.

Furthermore, the present invention, in accordance with another aspect thereof, provides a pollution control apparatus comprising a casing, a pollution control element disposed inside the casing, and a holding or mounting material for a pollution control element that is disposed between the casing and the pollution control element. The holding material for a pollution control element is the holding material for a pollution control element in accordance with the present invention.

The pollution control apparatus in accordance with the present invention is preferably a catalytic converter or an exhaust gas purification apparatus, for example, an exhaust gas filtering apparatus for an internal combustion engine.

When a pollution control element (e.g., catalyst carrier) is held with a holding or mounting material (e.g. in the form of a mat) in a pollution control apparatus (e.g., catalytic converter), the holding force of the pollution control element is represented by the following formula:

Holding force=(pressure generated in the holding material)×(static friction coefficient).

Therefore, increasing the pressure generated by the holding material by increasing the compression amount of the holding material or increasing the friction coefficient of the holding material are two general means that can be employed for increasing the holding force of the pollution control element. In accordance with the present invention, a friction layer comprising specific inorganic colloidal particles is formed on the surface of the holding material, preferably in the form of a mat. Therefore, due to the presence of this friction layer, the surface of the holding material can be imparted with a surface shape (a molecular surface state with a high degree of electric, magnetic and/or chemical interaction) exhibiting a friction coefficient higher than that of the surface of ceramic fibers or other inorganic fibers constituting the holding material. Furthermore, due to the presence of such a surface shape, the friction coefficient between the surface of the holding material and the surface of the pollution control element or the surface of the casing can be increased. In accordance with the present invention, the friction coefficient between the holding material and the casing can be increased especially significantly when the casing is from a metal plate, for example, stainless steel (SS).

Furthermore, in accordance with the present invention, imparting the surface of the mounting material with a fine peak-and-valley structure by using inorganic colloidal particles makes it possible to create dynamic interaction between the casing, for example, from a SS plate and the surface of the pollution control element. Therefore, the increase in friction coefficient can be even more significant. Moreover, using an organic binder together with the inorganic colloidal particles and attaching the particles to each other with the organic binder makes it possible to hold the inorganic colloidal particles on the holding material surface with good stability and prevent the particles from shedding or falling off the holding material surface.

The present invention can provide a holding material for a catalyst carrier or other pollution control element that excels in exhaust gas erosion resistance, surface pressure holding ability, and operability, makes it possible to avoid separation and displacement of a pollution control element (e.g., catalyst carrier) and the holding material when the holding material, wound about and holding the pollution control element, is press fitted into the corresponding casing, and can hold the pollution control element, without moving it, after the pollution control element was loaded into the casing. Furthermore, the holding material for a pollution control element in accordance with the present invention does not require a firing process when inorganic colloidal particles are fixedly attached to the holding material surface and, therefore, the manufacturing process can be simplified and the production cost can be reduced.

The present invention can also provide a pollution control apparatus comprising this holding material for a pollution control element and excelling in durability and other features, for example, a catalytic converter having the catalyst carrier holding material loaded therein or an exhaust gas purification apparatus (e.g., a diesel exhaust filter) comprising the holding material for a filter element. The pollution control element in accordance with the present invention can be advantageously used for treating exhaust gases in automobile engines, power generators and other internal combustion engines.

MODES FOR CARRYING OUT THE INVENTION

Figure 1:
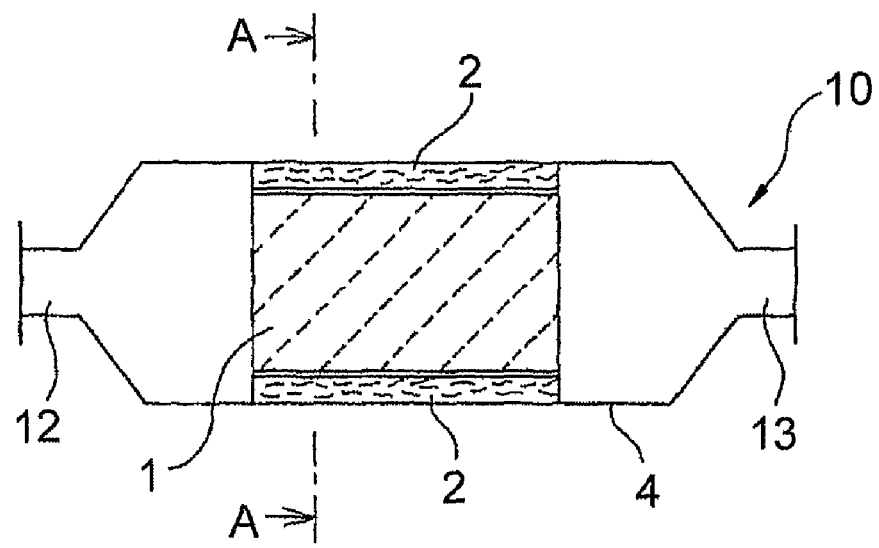
FIG. 1 is a cross-sectional view illustrating the configuration of the catalytic converter in accordance with the present invention.

The holding or mounting material for a pollution control element and the pollution control apparatus in accordance with the present invention can be advantageously implemented in a variety of forms. For example, the pollution control element can be a catalyst carrier (or a catalyst element), a fiber element (for example, an exhaust gas purification filter for diesel or other engines), or any other pollution control element. Similarly, the pollution control apparatus can be a catalytic converter, exhaust gas purification apparatus, for example, exhaust gas purification apparatus for diesel or other engines (for example, a diesel particulate filter unit), or any other pollution control apparatus corresponding to the pollution control element mounted therein. The implementation of the present invention will be described below with a specific reference to a catalyst carrier holding material and a catalytic converter, but the present invention is not limited to those modes.

A catalytic converter in accordance with the present invention is especially suitable for treating exhaust gases in automobile engines and other internal combustion engines and is configured to comprise at least a casing and a catalyst carrier (catalyst element) disposed inside the casing. Furthermore, a catalyst carrier holding material in accordance with the present invention, which is described herein below in greater detail, is installed between the casing and the catalyst carried so as to be wound about the outer peripheral surface of the catalyst carrier. Therefore, the inner peripheral surface of the casing is brought into intimate contact with the outer peripheral surface of the catalyst carrier holding material.

The catalyst carrier holding material is preferably appropriately compressed, in other words, used under a constant compressive force applied thereto, so as to have an adequate bulk density when it is installed in the casing. Clamshell compression, stuffing compression, and tourniquet compression are known as compression means. The catalyst carrier holding material in accordance with the present invention can be advantageously used in the manufacture of a catalytic converter of the so called press-fit structure in which the catalyst carrier holding material is pushed under pressure into, for example, a cylindrical casing, as in the case of stuffing compression.

As long as it employs the press-fit structure, the catalytic converter in accordance with the present invention can include various types of catalytic converters. The catalytic converter is preferably a catalytic converter comprising a monolithically molded catalyst element, that is, a monolithic catalytic converter. Because the catalytic converter comprises a catalytic element having small passages with a honeycomb cross section, it is less in size than the conventional pellet-type catalytic converters and the exhaust gas resistance can be reduced, while ensuring a sufficient contact surface area with the exhaust gas. As a result, the exhaust gas can be treated with higher efficiency.

The catalytic converter in accordance with the present invention can be advantageously used for treating exhaust gases in an assembly with a variety of internal combustion engines. In particular, the catalytic converter in accordance with the present invention can sufficiently demonstrate the excellent operation effect thereof when carried in exhaust systems of vehicles such as automobiles, buses, and trucks.

Figure 2:
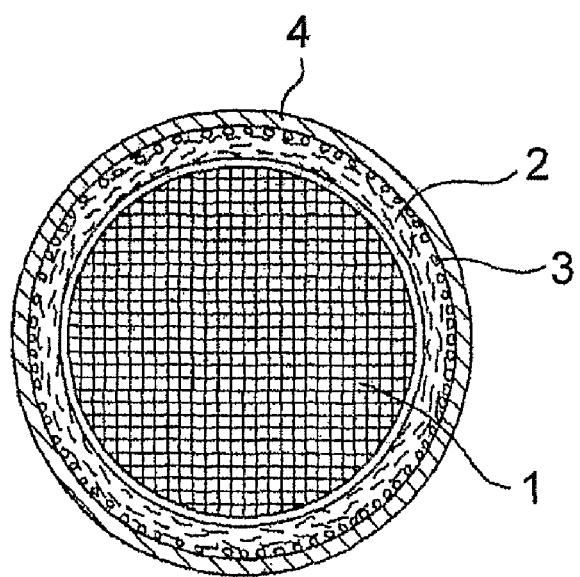
FIG. 2 is a cross-sectional view along the line segment A-A of the catalytic converter shown in FIG. 1.

FIG. 1 is a side view illustrating a typical example of the catalytic converter in accordance with the present invention. This figure shows a sectional view of the main components of the catalytic converter to facilitate the understanding of the structure thereof. FIG. 2 is a cross-sectional view of the catalytic converter along the line segment A-A in FIG. 1. As follows from those figures, a catalytic converter 10 comprises a metallic casing 4, a monolithic solid catalyst carrier 1 disposed inside the metallic casing 4, and a catalyst carrier holding material 2 in accordance with the present invention disposed between the metallic casing 4 and the catalyst carrier 1. The catalyst carrier holding material 2, as described herein below in greater detail, comprises a suitable fiber material in the form of a mat having the prescribed thickness and has a friction layer comprising inorganic colloidal particles on the inner peripheral surface of the mat on the side of the catalyst carrier and/or on the outer peripheral surface (surface region) on the side of the metallic casing. In the figure, as evident from the cross-sectional view of FIG. 3, of the surface region of the catalyst carrier holding material (mat) 2, the friction layer 3 comprising inorganic colloidal particles 5 is selectively formed on the outer peripheral surface of the mat on the side of the metallic casing 4. Cone-shaped exhaust gas inlet port 12 and exhaust gas outlet port 13 are attached to the catalytic converter 10.

In the case of the catalytic converter 10 in accordance with the present invention, essentially no joining means such as an adhesive or a pressure-sensitive sheet has to be introduced between the catalyst carrier 1 and the catalyst carrier holding material 2. However, such joining means may be additionally used, provided that it does not adversely influence the operation effect of the present invention, improves the intimate contact between the catalyst carrier 1 and the catalyst carrier holding material 2, and can be expected to facilitate the canning operation. The joining means is usually preferred to be used locally. Furthermore, a protective coating or the like may be provided on the catalyst carrier holding material 2 to protect the surface thereof from damage, etc., though this is not generally necessary. For example, a film of polyethylene, polyester, or natural rubber or a nonwoven fabric may be pasted on top of the friction layer 3 after the friction layer 3 has been formed.

Explaining more specifically, a solid catalyst carrier located inside a metallic casing is usually composed of a ceramic catalyst carrier of a honeycomb structure having a plurality of exhaust gas channels. The catalyst carrier holding material in accordance with the present invention is disposed by winding about the catalyst carrier. In addition to functioning as a thermal insulator, the catalyst carrier holding material holds the catalyst carrier inside the metallic casing and seals the gap formed between the catalyst carrier and the metallic casing. Therefore it can prevent the exhaust gases from flowing through a catalyst carrier as a bypass or at least minimize this undesirable flow. Furthermore, the catalyst carrier holding material is firmly and elastically supported inside the metallic casing.

In the catalytic converter in accordance with the present invention, the metallic casing can be fabricated in any shape corresponding to desired operation effect thereof from a variety of metallic materials well known in the field. The preferred metallic casing is manufactured from a stainless steel sheet (SS sheet) and has a shape shown in FIG. 1. It goes without saying that, if necessary, a metallic casing of any appropriate shape may be fabricated from a metal such as iron, aluminum, or titanium or alloys thereof.

Similarly to the metallic casing, the solid catalyst carrier can be fabricated to have a similar shape from a material similar to that employed in the usual catalytic converters. The appropriate catalyst carrier includes the catalytic converters manufactured from metals, ceramics, and the like and well known to those skilled in the art. An example of the appropriate catalyst carrier is disclosed in U.S. Reissued Pat. No. 27,747. Detailed description of catalyst monoliths is provided, for example, by Stroom et al. "Systems Approach to Packaging Design for Automotive Catalytic Converters" in Publication No. 900500 of SAE Technical Papers, Howitt "Thin Wall Ceramics as Monolithic Catalyst Support" in Publication No. 800082 of SAE Technical Papers, and Howitt et al. "Flow Effect in Monolithic Honeycomb Automotive Catalytic Converter" in Publication No. 740244 of SAE Technical Papers.

Catalysts that have to be supported on the above-described catalyst carriers are usually metals (for example, platinum, ruthenium, osmium, rhodium, iridium, nickel, and palladium) and metal oxides (for example, vanadium pentoxide and titanium dioxide), and are preferably used in the form of a coating. The detailed description of such catalyst coatings may be found, for example, in U.S. Pat. No. 3,441,381.

In the practice of the present invention, the catalytic converter may be manufactured by various methods in a variety of configurations, without departing from the scope of the present invention. It is especially preferred that the catalytic converter be essentially fabricated by accommodating, for example, a honeycomb ceramic catalyst carrier in a metallic casing and that the final catalyst carrier (catalyst element) be fabricated by supporting a catalyst layer (catalyst coating) from a noble metal such as platinum, rhodium, and palladium, for example, on a honeycomb ceramic monolith. Employing such a configuration makes it possible to demonstrate an effective catalytic action at a comparatively high temperature.

In accordance with the present invention, a catalyst carrier holding material in accordance with the present invention is disposed between the metallic casing and the catalyst element located inside thereof. The catalyst carrier holding material comprises a mat, a blanket, etc., of a fiber material having the prescribed thickness. The catalyst carrier holding material may be configured in the form of a single mat from one member, or may be configured in the form of a composite mat obtained by joining, for example, by laminating and adhesively joining, two or more members. Using the catalyst carrier holding material in the form of a mat, a blanket, etc. is usually advantageous from the standpoint of handleability and the like, but if necessary, the catalyst carrier holding material may have another form. The size of the catalyst carrier holding material can be varied within a wide range according to the target application thereof. For example, when a mat-shaped catalyst carrier holding material is used by loading into an automotive catalytic converter, the holding material usually has a thickness of about 1.5 to 15 mm, a width of about 200 to 500 mm, and a length of about 100 to 150 mm. If necessary such a holding material may be used upon cutting to the desired shape and size with scissors, a cutter, and the like.

The catalyst carrier holding material comprises a fiber material, preferably inorganic fibers. Inorganic fibers that are preferred for forming the catalyst carrier holding material include glass fibers, ceramic fibers, carbon fibers, silicon carbide fibers, and boron fibers, but if necessary, other inorganic fibers may be used. Those inorganic fibers may be used individually or in combinations of two or more kinds thereof and may be used in the form of composite fibers or other form. The especially preferred among those inorganic fibers are ceramic fibers such as alumina fibers, silica fibers, and alumina-silica fibers. Those ceramic fibers may be used individually or in combinations of two or more kinds thereof and may be used in the form of composite fibers or other form. Other inorganic materials may be used as add-in materials together with the above-described ceramic fibers or other inorganic fibers. Examples of suitable add-in materials include zirconia, magnesia, calcia, chromium oxide, yttrium oxide, and lanthanum oxide. Those add-in materials are usually used in the form of a powder or fine particles and may be used individually or as a mixture of two or more thereof.

In a specific example, inorganic fibers constituting the catalyst carrier holding material are composed, for example, of inorganic fibers comprising alumina ($Al_2O_3$ and silica ($SiO_2$). Here, inorganic fibers comprise two components: alumina and silica, and the compounding ratio of alumina and silica in this case is preferably within a range of about 40:60 to 96:4. The compounding ratio of alumina and silica being outside this range, for example, the compounding ratio of alumina being below 40% causes problems such as deteriorated heat resistance.

No specific limitation is placed on the thickness (mean diameter) of inorganic fibers, but it is preferred that the mean diameter be about 2 to 7 µm. If the inorganic fibers have a mean diameter of less than about 2 µm, the fibers tend to become brittle and have insufficient strength. Conversely, if the fibers have a mean diameter of larger than about 7 µm, the holding material tends to be difficult to mold.

Furthermore, similarly to the thickness, the length of the inorganic fibers is not limited either. However, it is preferred that the fibers have an average length of about 0.5 to 50 mm. If the average length of the inorganic fibers is less than about 0.5 mm, no effect is demonstrated if the holding material is formed by using such fibers. Conversely, if the average length is more than about 50 mm, handleability thereof degrades and the process for manufacturing the holding material is difficult to implement smoothly.

Following another method, when the present invention is implemented, an alumina-based fiber mat mainly comprising a laminated sheet of alumina fibers also can be advantageously used as a catalyst carrier holding material. In such an alumina-based fiber mat, the average length of alumina fibers is usually within a range of about 20 to 200 mm and the thickness (mean diameter) of the fibers is usually within a range of about 1 to 40 µm. The alumina fibers are preferably mullite fibers with an $Al_2O_3/SiO_2$ weight ratio ($Al_2O_3/SiO_2$) is about 70/30 to 74/26.

The aforementioned alumina-based fiber mat can be manufactured by using, for example, a spinning starting solution comprising a mixture of an alumina source such as aluminum oxychloride, a silica source such as silica sol, an organic binder such as poly(vinyl alcohol), and water. Thus, a spun alumina fiber precursor is laminated to form a sheet, then preferably subjected to needle punching and thereafter usually fired at a high temperature of about 1000 to 1300° C.

Figure 3:
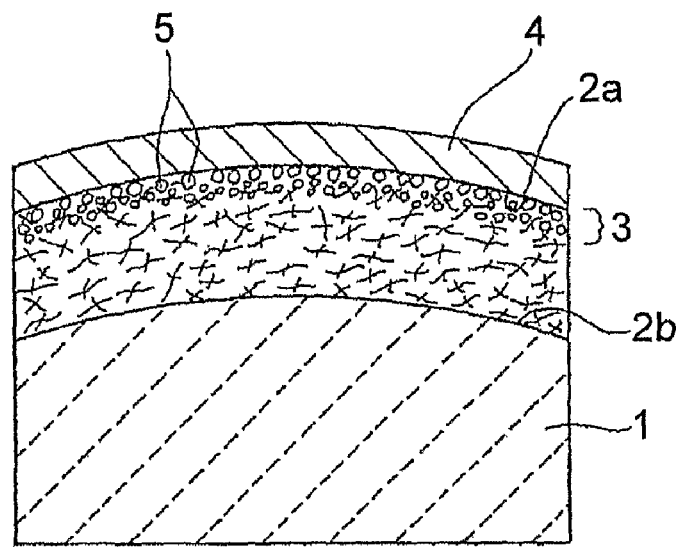
FIG. 3 is a cross-sectional view illustrating schematically the friction layer in the catalyst carrier holding material in the catalytic converter shown in FIG. 1.

The catalyst carrier holding material in accordance with the present invention, as shown schematically in FIG. 3, comprises a mat 2 of a fiber material with the prescribed thickness that is inserted between a casing 4 and a catalyst carrier 1 loaded thereinto, the mat being wound about the outer peripheral surface of the catalyst carrier 1. In this mat-shaped catalyst carrier holding material 2, inorganic colloidal particles 5 capable of increasing the function coefficient with the casing 4 are selectively disposed and a friction layer 3 is formed in the outer peripheral surface 2a of the holding material on the side of the casing 4, in particular, exclusively in this surface region. Furthermore, if necessary, a friction layer comprising inorganic colloidal particles may be also disposed on the inner peripheral surface 2b of the catalyst carrier holding material 2 on the side of the catalyst carrier 1 (this is not shown in the figure).

In the practice of the present invention, the friction layer of the catalyst carrier holding material can be formed by using a variety of techniques, but it can be advantageously formed by coating a colloidal solution comprising fine particles of an inorganic material, preferably a metal oxide on the surface of a mat of a fiber material that has already been manufactured. Thus, the inorganic colloidal particles substantially constituting the friction layer are preferably derived from a colloidal solution comprising metal oxide fine particles.

Fine particles of inorganic materials of a variety of types can be used to form the inorganic colloidal particles, but the preferred inorganic materials include metal oxides, nitrides, and carbides, and those materials preferably have heat resistance. For example, the preferred examples of metal oxides having heat resistance include silica, alumina, mullite, zirconia, magnesia, and titania, but this list is not limiting. Examples of other suitable materials include boron nitride and boron carbide. Those inorganic materials may be used individually or in combinations of two or more thereof.

Though the above-described inorganic colloidal particles can be used in a variety of particle sizes correspondingly to the type of inorganic material and desired friction improvement effect, it is usually preferred that they have a mean particle size of about 1 to 100 nm. If the mean particle size of inorganic colloidal particles is less than 1 nm, the friction layer capable of contributing to the friction increase effect is impossible to form. Conversely, if the mean particle size of inorganic colloidal particles exceeds 100 nm, the particles are too large, cannot appropriately contribute to friction increase, and can fall off. The mean particle size of the inorganic colloidal particles is more preferably within a range of about 10 to 80 nm, and most preferably within a range of about 20 to 50 nm.

In the catalyst carrier holding material in accordance with the present invention, the friction layer can be formed by adding the inorganic colloidal particles in various amounts to the surface region of the holding material, but usually it is preferred that the inorganic colloidal particles be added in an amount of about 0.01 to 30 wt. % based on the entire weight of the holding material. If the amount of added inorganic colloidal particles is less than 0.01 wt. %, the effect of adding the inorganic colloidal particles is not demonstrated and, therefore, the friction coefficient cannot be expected to increase. Conversely, if the amount of added inorganic colloidal particles is above 30 wt. %, the mat becomes hard and the holding material is cracked or bent during usage. The amount of added inorganic colloidal particles is more preferably about 0.05 to 25 wt. % and most preferably about 0.1 to 10 wt. %.

The friction layer comprised by the above-described inorganic colloidal particles can be formed by treating the holding material by any method after the catalyst carrier holding material has been manufactured. Explaining the manufacture of the catalyst carrier holding material, the holding material can be manufactured by a variety of methods including a dry method and a wet method. For example, when the manufacture based on a dry method can be implemented by subjecting a laminated body of inorganic fibers to needle punching. Furthermore, a wet method can be implemented by a series of processes comprising mixing the inorganic fibers with an organic binder, spreading the inorganic fibers, preparing a slurry, molding by a paper molding method, and pressing the molded body.

The friction layer comprising inorganic colloidal particles can be preferably formed, for example, by coating a colloidal solution comprising fine particles of an inorganic material such as a metal oxide on the surface of the manufactured catalyst carrier holding material (fiber material mat). Examples of methods suitable for coating include roll coating, spray coating, film transfer, and dip coating. The desired friction layer can be obtained by conducting drying, for example, at a temperature of about 100-200° C. upon completion of the coating process. It is clear that heat treatment at a high temperature, such as firing, that was necessary with the conventional technology is not required in this manufacturing method. Therefore, the coating liquid alone may be prepared independently of the fiber material mat, this being an advantage from the standpoint of process conditions.

In accordance with the present invention, as described hereinabove, disposing a friction layer comprising inorganic colloidal particles on the surface of the catalyst carrier holding material makes is possible to increase the friction coefficient between the catalyst carrier surface and the casing formed, for example, from a SS sheet or other metal sheet. Therefore, the performance of the catalyst carrier holding material and, therefore, a catalytic converter using same can be improved. As was discovered by the inventor, it is preferred that an organic binder be used together with the above-described inorganic colloidal particles in the friction layer formed on the surface region of the catalyst carrier holding material. Configuring the friction layer so that it comprises an organic binder together with inorganic colloidal particles makes it possible to improve further the functions of the friction layer, prevent the inorganic colloidal particles from shedding or falling off, and increase the friction coefficient before and after heating the catalyst converter.

No specific limitation is placed on the kind and amount of the organic binder employed together with the inorganic colloidal particles, and an advantageous material can be selected for use from materials having a function of an adhesive agent or the like. For example, acrylic resins, styrene-butadiene resins, acrylonitrile resins, polyurethane resins, natural rubbers, and poly(vinyl acetate) resins supplied in the form of a latex or the like can be used as the organic binder. Furthermore, such organic binders may comprise a flexible thermosetting resin, for example, an unsaturated polyester resin, an epoxy resin, or a polyvinyl ester resin.

When an organic binder is used together with the inorganic colloidal particles, though the organic binder can be used in various amounts, it is usually preferred that the organic binder be used by adding in an amount of 1/20 or more (weight ratio) to the inorganic colloidal particles. This is because the effect of adding the organic binder is observed and the inorganic colloidal particles are more reliably fixed to the surface of the catalyst carrier holding material and held therein only after the organic binder is added in an amount of 1/20 or more (weight ratio) to the inorganic colloidal particles. Furthermore, if the total amount of the organic binder becomes 15 wt. % or more based on the weight of the holding material, the specific amount depending on the surface area of the catalyst carrier holding material, combustion gases can produce an adverse influence on a gas sensor when the catalytic converter is carried and used at a real vehicle. Therefore, the amount of the organic binder used is preferably less than 15 wt. %.

In accordance with the present invention, as described hereinabove, coating and disposing the inorganic colloidal particles and organic binder at the same time on the surface of the catalyst carrier holding material makes it possible to control the permeation of the inorganic colloidal particles inside the fiber material constituting the holding material and to form the desired friction layer on the surface region of the holding material. However, considering that the selective distribution of inorganic colloidal particles in the surface region is very difficult to measure and confirm when the fiber material of the holding material and the inorganic material of the inorganic colloidal particles have almost identical compositions, in accordance with the present invention, given the fact that the inorganic colloidal solution and organic binder are coated and dried simultaneously, distribution of the inorganic colloidal particles was measured from the loss on heat during holding of the catalyst carrier holding material in an oven at 900° C. for 1 hour.

EXAMPLES

The present invention will be described herein below with reference to examples thereof. It goes without saying that the present invention is not limited to those examples.

Example 1

In the present example:

(1) the relationship between a compounding ratio of inorganic colloidal particles and an organic binder and a shedding ratio of the inorganic colloidal particles;

(2) the relationship between the amount of inorganic colloidal particles and the friction coefficient between a SS plate and a mat; and (3) the relationship between the amount of inorganic colloidal particles and the friction coefficient between a catalyst carrier and a mat were tested with respect to the case where the compounding ratio of the inorganic colloidal particles and organic binder was varied during the formation of the friction layer of a catalyst carrier holding material.

A needle-punched alumina fiber mat (trade name MAFTEC, manufactured by Mitsubishi Chemical Functional Products, Inc.) with a mat surface density of 0.4 g/cm$^3$ was prepared. The size of the alumina fiber mat was 260 mm (length)×90 mm (width)×12.5 mm (thickness). Furthermore, inorganic colloidal particles: colloidal silica (manufactured by Nissan Chemical Co., Ltd., trade name SNOWTEX-O) and organic binder: acrylic latex (manufactured by Nippon Zeon Co., Ltd., trade name NIPOL LX-820A) were stirred and mixed in water at different compounding ratios, as described in Table 1 below, to be used for forming a friction layer. Colloidal coating solutions of four types were prepared.

Then each coating solution was spray coated on the surface of the alumina fiber mat. The alumina fiber mat subjected to coating was placed into an oven at 180° C., dried till the moisture content became about 50%, and then further absolutely dried in a cylinder drier set to 145° C. In the dried alumina fiber mat, fine silica particles were confirmed to adhere to the surface thereof.

Determination of Shedding Ratio of Fine Silica Particles

A shedding ratio (wt. %) of fine silica ($SiO_2$) particles was measured following the below-described procedure with respect to each alumina fiber mat that was fabricated in the above-described manner and had fine silica particles adhered thereto.

An impact test machine described in Japanese Industrial Standard (JIS K-6830) was prepared and an impact test was implemented following the guidelines described in this standard. The test method was as follows.

(1) A sample (size: 100 mm×100 mm) was fabricated with a punching die and a mass thereof was measured.

(2) The sample was set in the impact test machine described in JIS K-6830 and subjected to impacts from an angle of 30°.

(3) The sample subjected to the test was taken off the impact test machine and the mass thereof was measured again.

(4) The scattered amount of fine silica particles was calculated from the difference in the mass of the sample measured before and after the test. The measurement results (shedding ratio of fine silica particles, wt. %) described in Table 1 below and plotted in the appended FIG. 5 were obtained.

TABLE 1

| Latex/SiO$_2$ ratio | Shedding ratio (wt. %) |
| --- | --- |
| 0.11 | 0.047 |
| 0.11 | 0.111 |
| 0.11 | 0.063 |
| 0.11 | 0.108 |
| 1.05 | 0.007 |
| 1.05 | 0.008 |
| 1.05 | 0.011 |
| 6.99 | 0.008 |
| 6.99 | 0.010 |
| 6.93 | 0.007 |
| 6.93 | 0.003 |

Figure 5:
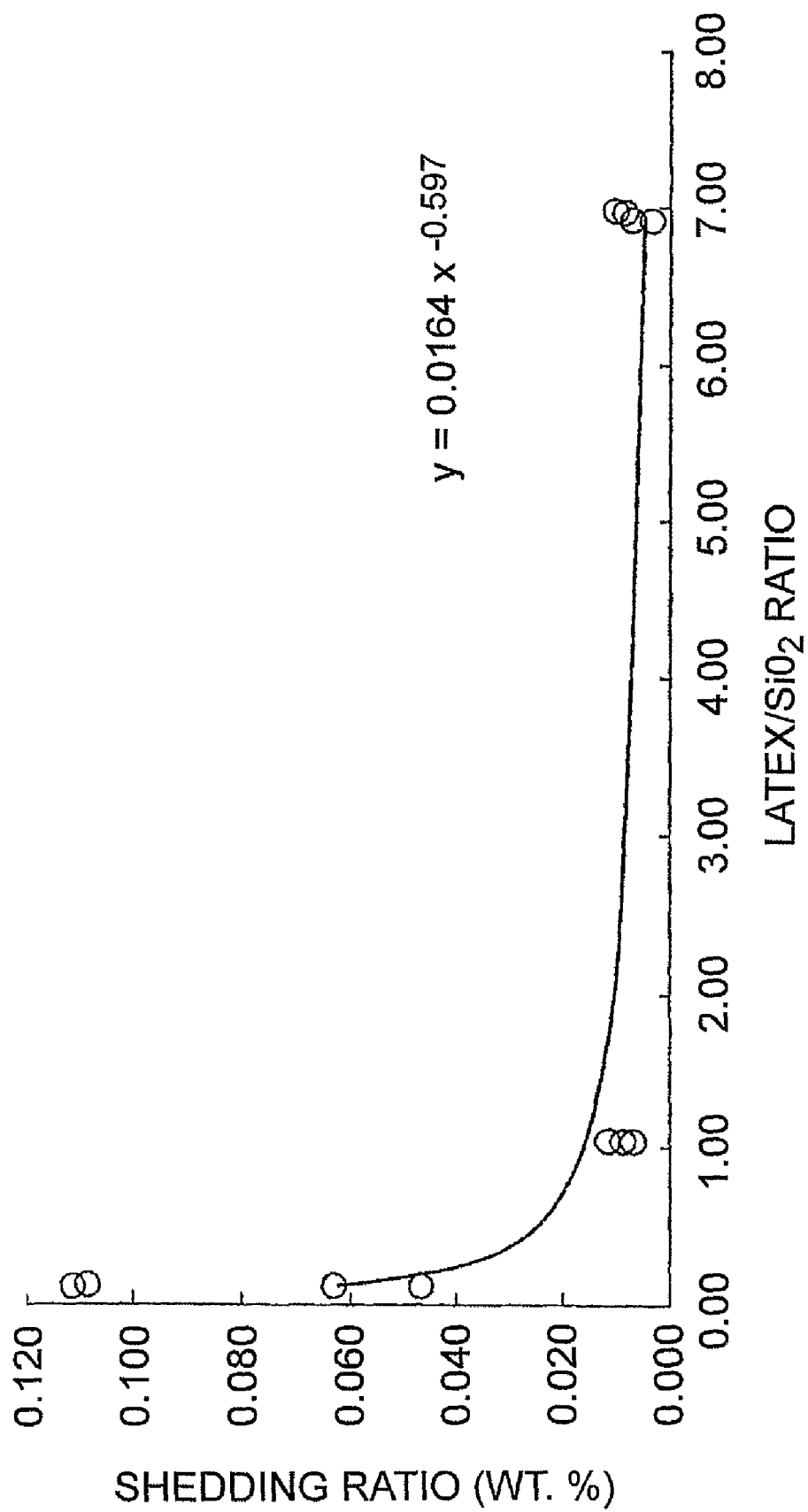
FIG. 5 is a graph representing the relationship between the ratio of the organic binder and colloidal silica and the shedding ratio of silica particles in the catalyst carrier holding material fabricated in Example 1.

As can be understood from the measurement results described in Table 1 above and FIG. 5, when the latex ratio (ratio of latex to fine silica particles) is higher than 1/20, shedding of fine silica particles can be effectively prevented.

Friction Coefficient Between a SS Plate and a Mat

A friction coefficient between a SS plate and a mat was measured following the below-described procedure by using an Autograph AGS 100D (trade name) manufactured by Shimazu Corp. with respect to the alumina fiber mats that were fabricated in the above-described manner and had fine silica particles adhered thereto.

Figure 4:
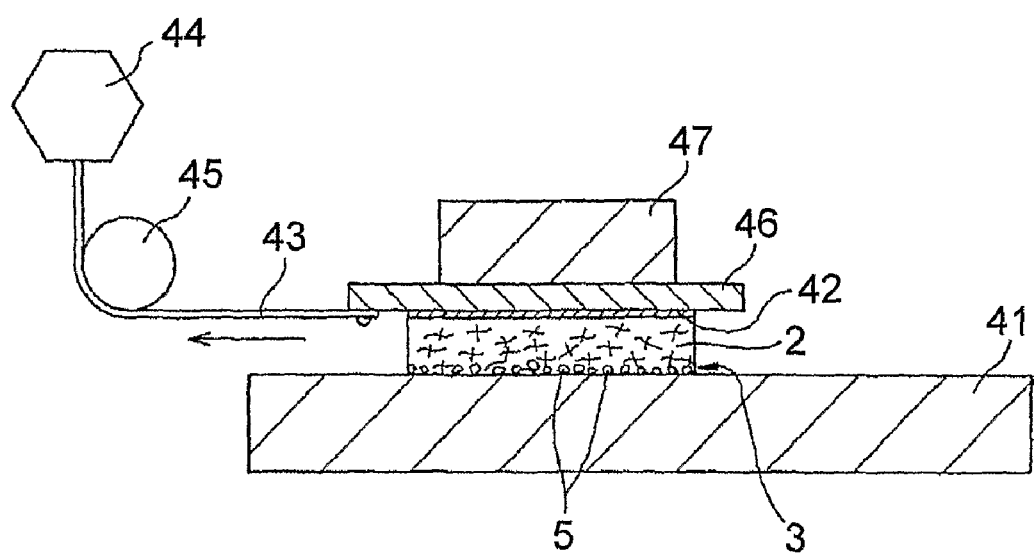
FIG. 4 is a cross-sectional view illustrating schematically the method for measuring the friction coefficient of the catalyst carrier holding material.

The respective samples were cut to obtain sample pieces with a length of 50 mm, a width of 25 mm and a thickness of 12.5 mm. Then, as shown in FIG. 4, the surface of the sample piece 2 that is on the side opposite that of the surface having the friction layer 3 was fixed to a SS plate 46 via the two-side adhesive tape 42.

A stainless steel cord 43 with a length of about 1 m was then prepared and one end thereof was fixed to the SS plate 46. A pulley block 45 was disposed immediately below a load cell 44 and the other end of the steel cord 43 was fixed to the load cell 44 via the pulley block 45 so that the SS plate 46 fixed to the sample piece 2 moved parallel to the ground surface when the load cell 44 was raised.

The sample piece 2 was then placed on a SS plate 41 and fixed thereto so as to be parallel to the ground surface, with the central axis of the SS plate 41 being straight upright with respect to the pulley block 45. Here, the SS plate 41 used in place of the casing was subjected to a 2B treatment (cold rolling treatment) and machined to have a surface roughness Ra of about 0.2 to 0.5 μm. Furthermore, the height of the load cell 44 was adjusted so that the sample piece 2 could be loaded in the position at the largest distance from the pulley block 45.

A load 47 of 12 kg was then fixedly mounted on the SS plate 46, the load cell 44 was thereafter raised, and the stainless steel cord 43 was pulled in the direction shown by an arrow at a pulling rate of 100 cm/min. A load measured immediately before the sample piece 2 slipped off the surface of the SS plate 41 was recorded as a static friction force (kgf) and a static friction coefficient was calculated by dividing it by a load applied to the sample piece 2 including the SS plate 46. The measurement results (friction coefficient between the SS plate and the mat) described in Table 2 below and plotted in the appended FIG. 6 were obtained. Furthermore, "amount of $SiO_2$" in the table and figure mean the amount of fine silica particles related to the entire weight of the mat.

TABLE 2

| Amount of $SiO_2$ (wt. %) | Friction coefficient between SS plate and mat |
| --- | --- |
| 0.0% | 0.196 |
| 0.1% | 0.208 |
| 0.2% | 0.221 |
| 0.5% | 0.213 |
| 0.6% | 0.229 |
| 1.3% | 0.225 |
| 1.3% | 0.238 |
| 1.4% | 0.233 |
| 3.2% | 0.242 |
| 4.1% | 0.233 |
| 4.5% | 0.246 |

Friction Coefficient Between a Catalyst Carrier and a Mat

A friction coefficient between a catalyst carrier and a mat was measured following the procedure described above in relation to the friction coefficient between the SS plate and the mat by using an Autograph AGS 100D (trade name) manufactured by Shimazu Corp. with respect to alumina fiber mats that were fabricated in the above-described manner and had fine silica particles adhered thereto.

Samples were cut to fabricate sample pieces and those sample pieces were mounted on the testing machine shown in FIG. 4. However, because in this case the object is to measure the friction coefficient between a catalyst carrier and a mat, a catalyst carrier (monolith body manufactured by Nippon Gaishi K. K., trade name "HONEYCERAM") was used instead of the SS plate 41 serving for the casing shown in FIG. 4. The catalyst carrier had a surface roughness Ra of about 2.5 μm.

The load 47 of 12 kg was fixedly mounted on the SS plate 46, the load cell 44 was thereafter raised, and the stainless steel cord 43 was pulled in the direction shown by an arrow at a pulling rate of 100 cm/min. A load measured immediately before the sample piece 2 slipped off the surface of the SS plate 41 was recorded as a static friction force (kgf) and a static friction coefficient was calculated by dividing it by a load applied to the sample piece 2 including the SS plate 46. The measurement results (friction coefficient between the catalyst carrier and the mat) described in Table 3 below and plotted in the appended FIG. 7 were obtained.

TABLE 3

| Amount of $SiO_2$ (wt. %) | Friction coefficient between carrier and mat |
| --- | --- |
| 0.0% | 0.554 |
| 0.1% | 0.633 |
| 0.2% | 0.600 |
| 0.6% | 0.613 |
| 0.6% | 0.633 |
| 1.3% | 0.650 |
| 1.3% | 0.646 |
| 1.4% | 0.613 |
| 3.2% | 0.617 |
| 4.1% | 0.642 |
| 4.5% | 0.683 |

Figure 6:
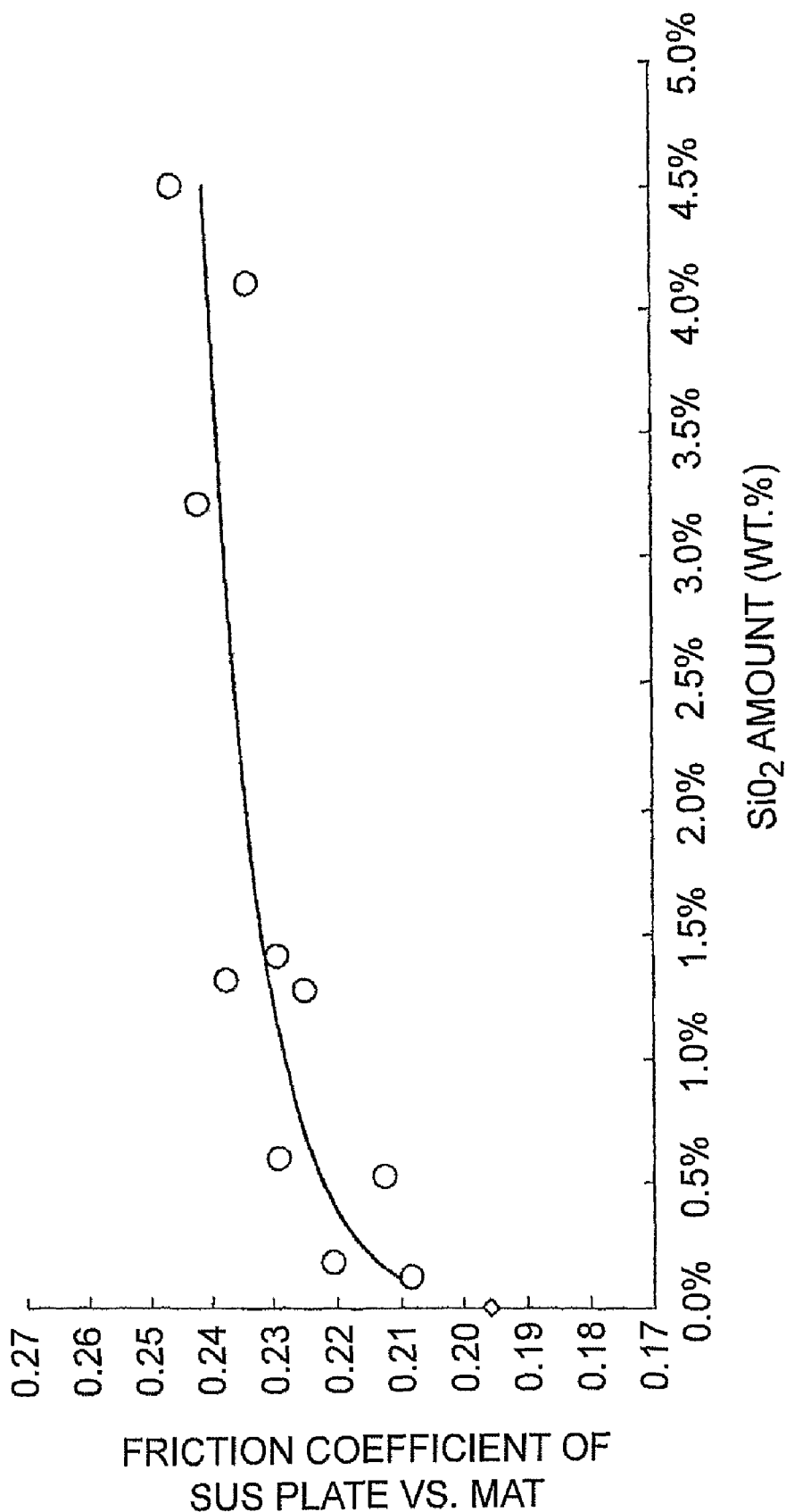
FIG. 6 is a graph representing the relationship between the amount of colloidal silica and the friction coefficient between the SS plate and the mat in the in the catalyst carrier holding material fabricated in Example 1.
Figure 7:
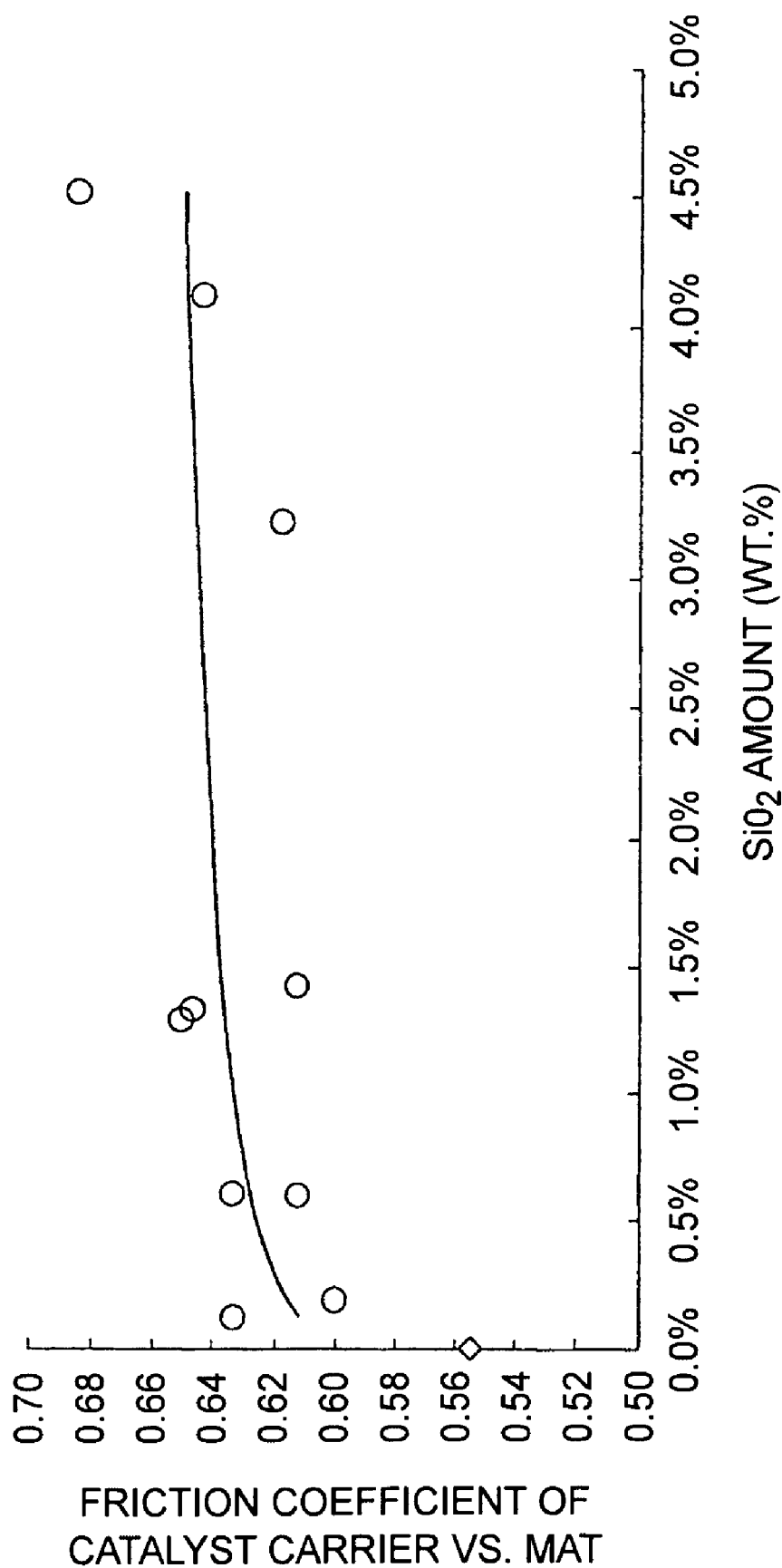
FIG. 7 is a graph representing the relationship between the amount of colloidal silica and the friction coefficient between the holding material and the mat in the in the catalyst carrier holding material fabricated in Example 1.

As follows from the approximation curve of friction coefficient shown in FIG. 6 and FIG. 7, when the applied amount of inorganic colloidal particles (fine silica particles) is 0.01 wt. % or more based on the mat weight, the increase in friction coefficient can be observed for both the friction coefficient between the SS plate and the mat and for the friction coefficient between the catalyst carrier and the mat. Furthermore, because both the surface of the SS plate and the surface of the monolith body used for measuring the friction coefficients in the present example had a roughness Ra of about 2.5 μm, it can be generally said that in the case of the present invention the effect of increasing the friction coefficient can be obtained when the casing and catalyst carrier have a surface roughness Ra of about 2.5 μm or larger.

Example 2

In the present example:

(1) the relationship between a compounding ratio of inorganic colloidal particles and an organic binder and a shedding ratio of the inorganic colloidal particles;

(2) the relationship between the amount of inorganic colloidal particles and the friction coefficient between a SS plate and a mat; and (3) the relationship between the amount of inorganic colloidal particles and the friction coefficient between a catalyst carrier and a mat were tested with respect to the case where the compounding ratio of the inorganic colloidal particles and organic binder was varied during the formation of the friction layer of a catalyst carrier holding material, following the procedure described in Example 1.

Fine colloidal particles: colloidal alumina (manufactured by Nissan Chemical Co., Ltd., trade name ALUMINA SOL-200) and organic binder: acrylic latex (manufactured by Rohm and Haas Co., Ltd., trade name ST-954) were stirred and mixed in water at different compounding ratios, as described in Table 4 below, to be used for forming a friction layer. Colloidal coating solutions of three types were prepared. Then each coating solution was spray coated on the surface of an alumina fiber mat and dried. In the dried alumina fiber mat, the alumina was confirmed to adhere to the surface thereof.

Determination of Shedding Ratio of Fine Silica Particles

A shedding ratio (wt. %) of fine alumina ($Al_2O_3$) particles was measured following the procedure described in Example 1 with respect to each alumina fiber mat that was fabricated in the above-described manner and had fine silica particles adhered thereto. The measurement results (shedding ratio of fine alumina particles, wt. %) described in Table 4 below and plotted in the appended FIG. 8 were obtained.

TABLE 4

| Latex/$Al_2O_3$ ratio | Shedding ratio (wt. %) |
| --- | --- |
| 0.23 | 0.031 |
| 0.23 | 0.027 |
| 0.23 | 0.033 |
| 2.25 | 0.007 |
| 2.25 | 0.007 |
| 2.25 | 0.017 |
| 2.25 | 0.007 |
| 11.25 | 0.002 |
| 11.25 | 0.002 |
| 11.25 | 0.008 |

Figure 8:
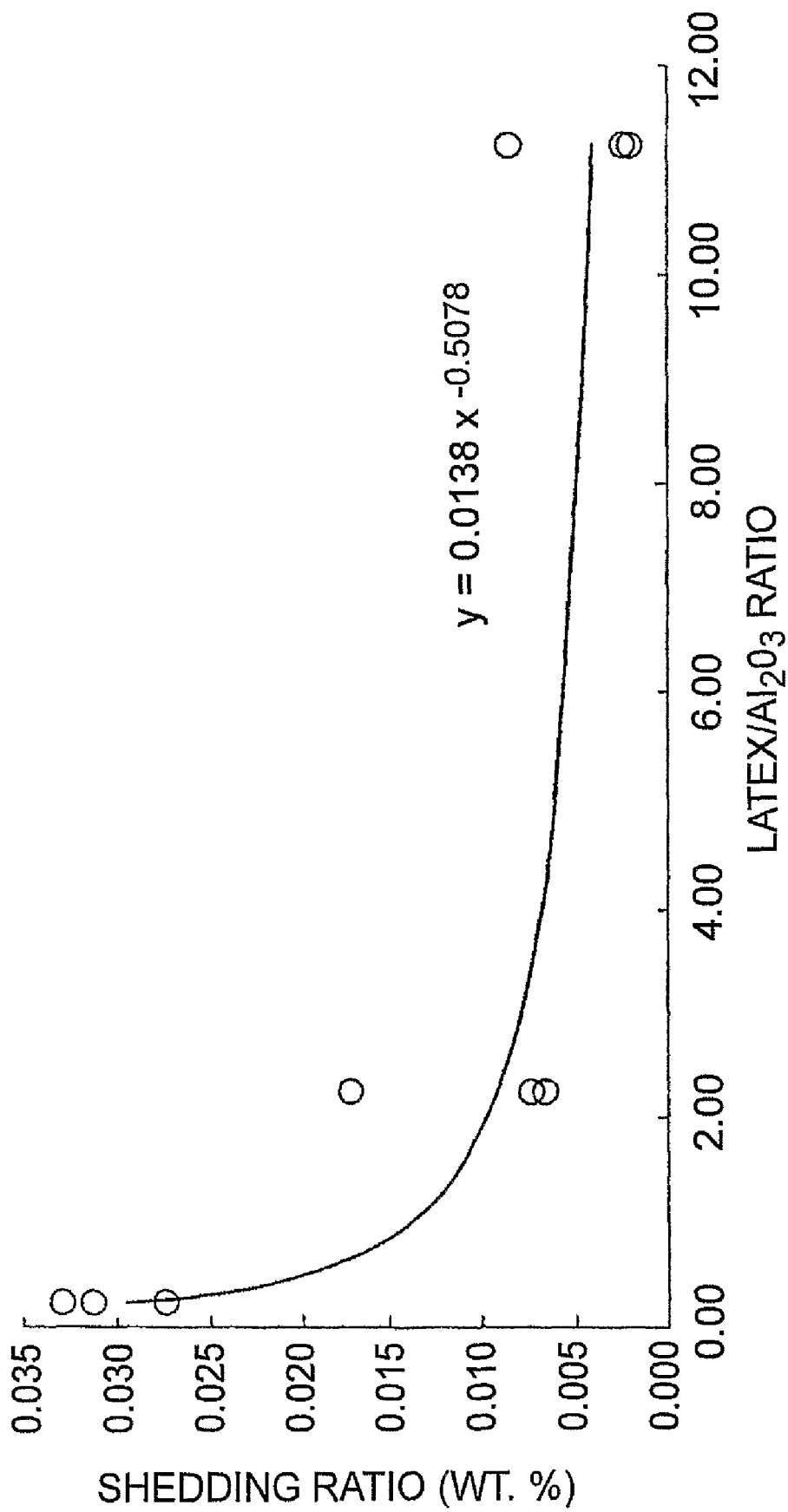
FIG. 8 is a graph representing the relationship between the ratio of the organic binder and colloidal alumina and the shedding ratio of alumina particles in the catalyst carrier holding material fabricated in Example 2.

As can be understood from the measurement results described in Table 4 above and FIG. 8, when the latex ratio (ratio of latex to fine alumina particles) is higher than 1/20, shedding of fine alumina particles can be effectively prevented.

Friction Coefficient Between a SS Plate and a Mat

A friction coefficient between a SS plate and a mat was measured following the procedure described in Example 1 with respect to the alumina fiber mats that were fabricated in the above-described manner and had fine alumina particles adhered thereto. The measurement results (friction coefficient between the SS plate and the mat) described in Table 5 below and plotted in the appended FIG. 9 were obtained. Furthermore, "amount of $Al_2O_3$" in the table and figure mean the amount of fine alumina particles related to the entire weight of the mat.

TABLE 5

| Amount of $Al_2O_3$ (wt. %) | Friction coefficient between SS plate and mat |
| --- | --- |
| 0.0% | 0.188 |
| 0.1% | 0.208 |
| 0.1% | 0.200 |
| 0.1% | 0.196 |
| 0.1% | 0.196 |
| 0.3% | 0.200 |
| 0.3% | 0.204 |
| 0.7% | 0.213 |
| 0.7% | 0.217 |
| 2.6% | 0.208 |
| 2.7% | 0.213 |

Friction Coefficient Between a Catalyst Carrier and a Mat

A friction coefficient between a catalyst carrier and a mat was measured following the procedure described in Example 1 with respect to alumina fiber mats that were fabricated in the above-described manner and had fine alumina particles adhered thereto. The measurement results (friction coefficient between the catalyst carrier and the mat) described in Table 6 below and plotted in the appended FIG. 10 were obtained.

TABLE 6

| Amount of $Al_2O_3$ (wt. %) | Friction coefficient between carrier and mat |
| --- | --- |
| 0.0% | 0.554 |
| 0.1% | 0.588 |
| 0.1% | 0.625 |
| 0.1% | 0.638 |
| 0.1% | 0.671 |
| 0.3% | 0.633 |
| 0.3% | 0.638 |
| 0.7% | 0.646 |
| 0.7% | 0.638 |
| 2.6% | 0.663 |
| 2.7% | 0.679 |

Figure 9:
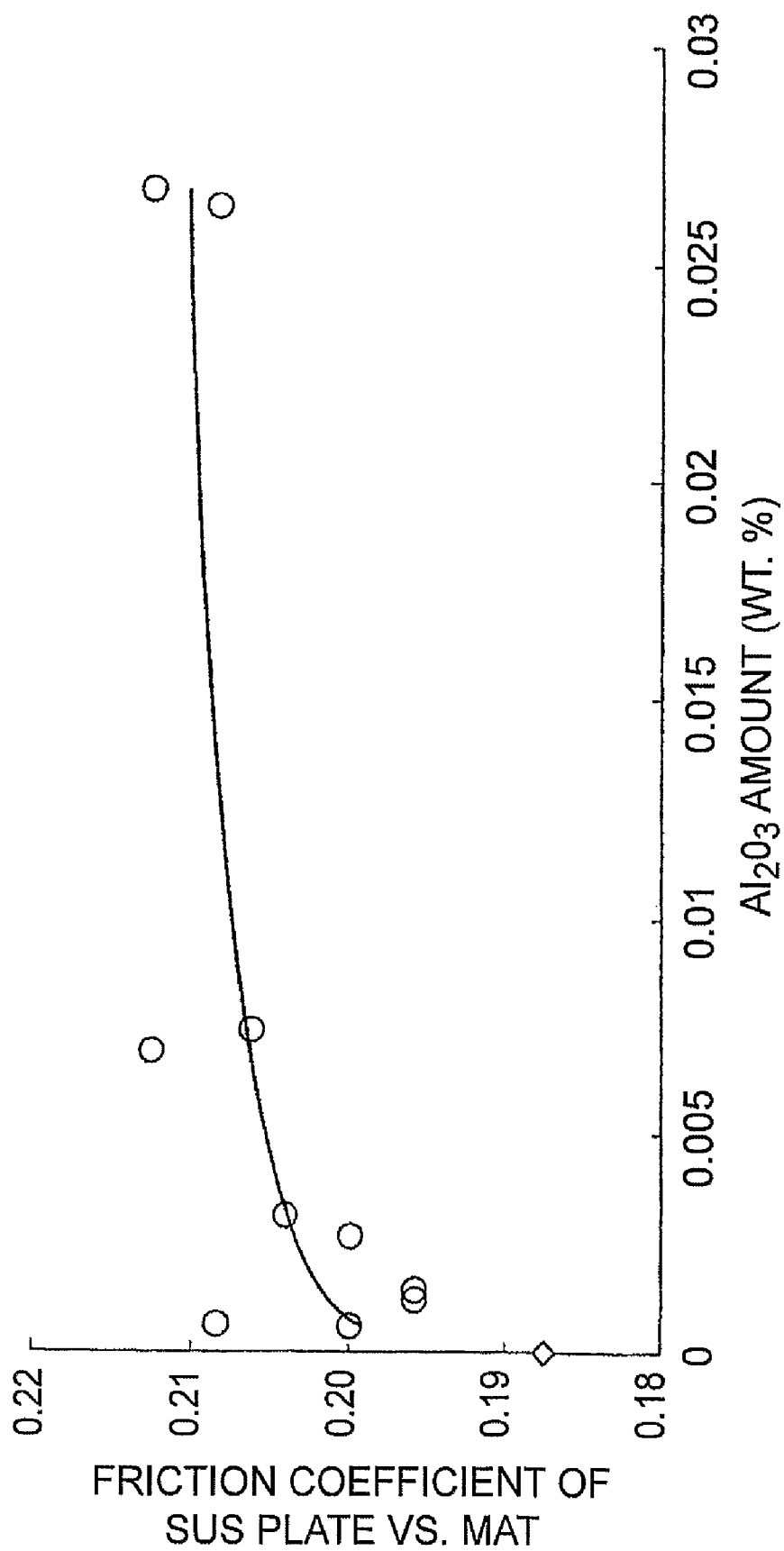
FIG. 9 is a graph representing the relationship between the amount of colloidal alumina and the friction coefficient between the SS plate and the mat in the in the catalyst carrier holding material fabricated in Example 2.
Figure 10:
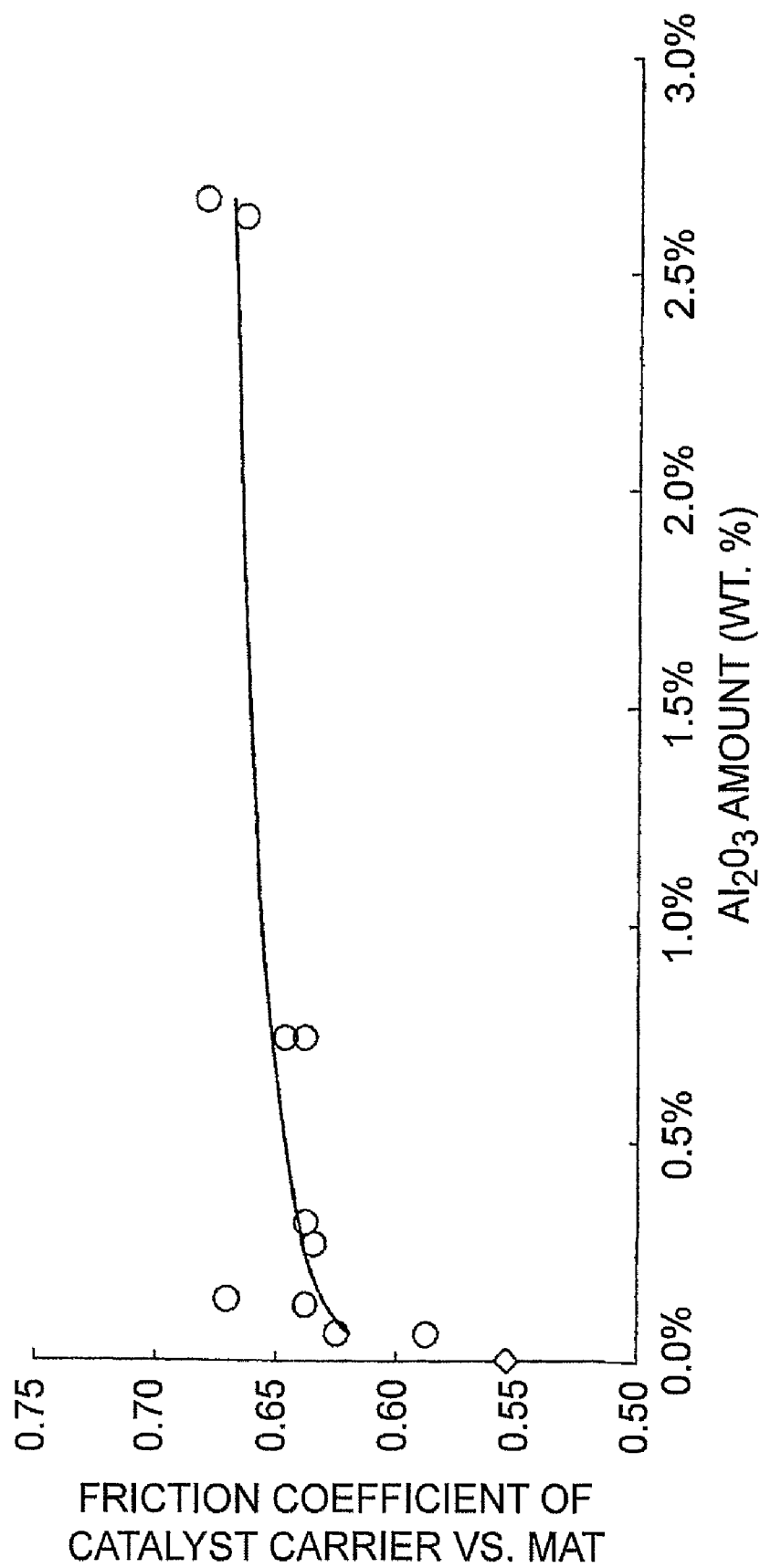
FIG. 10 is a graph representing the relationship between the amount of colloidal alumina and the friction coefficient between the holding material and the mat in the in the catalyst carrier holding material fabricated in Example 2.

As follows from the approximation curve of friction coefficient shown in FIG. 9 and FIG. 10, when the applied amount of inorganic colloidal particles (fine alumina particles) is 0.01 wt. % or more based on the mat weight, the increase in friction coefficient can be observed for both the friction coefficient between the SS plate and the mat and for the friction coefficient between the catalyst carrier and the mat. Furthermore, because both the surface of the SS plate and the surface of the monolith body used for measuring the friction coefficients in the present example had a roughness Ra of about 2.5 μm, it can be generally said that in the case of the present invention the effect of increasing the friction coefficient can be obtained when the casing and catalyst carrier have a surface roughness Ra of about 2.5 μm or larger.

Example 3

Production of Catalytic Converter

With respect to samples that yielded good measurement results in the evaluation tests of Examples 1 and 2, alumina fiber mats provided with a friction layer of the same structure as those samples were fabricated. Then the alumina fiber mat was wound about the outer periphery of a separately prepared catalyst carrier (monolith body manufactured by Nippon Gaishi K. K., trade name "HONEYCERAM") having a cylindrical shape with an outer diameter of 78 mm and a length of 100 mm. The catalyst carrier with the alumina fiber mat wound thereabout was press fitted at 40 mm/sec by using a guide cone into a cylindrical stainless steel casing with an inner diameter of 84 mm and a length of 120 mm. In this canning process, a gap between the catalyst carrier and the casing was about 3 mm. Press fitting was carried out by using the catalyst carrier side, the casing side, and the alumina fiber mat having friction layers formed on both surfaces thereof on the catalyst carrier side and the casing side, but the target catalytic converter could be fabricated without any inconveniences such as damage of the catalyst carrier or alumina fiber mat and decrease in assembling operability. Furthermore, no displacement occurred between the catalyst carrier and alumina fiber mat. Moreover, the catalytic converter obtained could sufficiently demonstrate the target exhaust gas purification function in actual use.

What is claimed is:

1. A holding material for a pollution control element, which is to be wound about and hold the pollution control element inside a casing and disposed between the casing and the pollution control element, said holding material comprising:

an inorganic fiber material mat having a thickness, an outer peripheral surface and an inner peripheral surface; and at least one friction layer comprising inorganic colloidal particles adhered to one of the inner and outer peripheral surface of said mat, and said inorganic colloidal particles comprising fine particles of an inorganic material, wherein said friction layer contacts at least one of the casing and the pollution control element, when said holding material is disposed in a pollution control apparatus between the casing and the pollution control element.

2. The holding material according to claim 1, wherein said at least one friction layer is at least two friction layers, each comprising inorganic colloidal particles, with one said friction layer being on the outer peripheral surface of said mat, the other friction layer being on the inner peripheral surface of said mat, and with said one friction layer contacting the casing and said other friction layer contacting the pollution control element, when said holding material is disposed in a pollution control apparatus between the casing and the pollution control element.

3. The holding material according to claim 1, wherein said fiber material comprises at least one kind of inorganic fibers selected from the group consisting of glass fibers, ceramic fibers, carbon fibers, silicon carbide fibers, and boron fibers.

4. The holding material according to claim 1, wherein said inorganic colloidal particles are derived from a colloidal solution comprising fine particles of at least one inorganic material selected from the group consisting of metal oxides, nitrides, and carbides.

5. The holding material according to claim 1, wherein said inorganic colloidal particles have a mean particle size of 1 to 100 nm.

6. The holding material according to claim 1, wherein said inorganic colloidal particles are contained in an amount of 0.01 to 30 wt. % based on the total weight of said holding material.

7. The holding material according to claim 1, wherein each said friction layer further comprises an organic binder together with said inorganic colloidal particles.

8. The holding material according to claim 7, wherein said organic binder is added in an amount of 1/20 (weight ratio) or more to said inorganic colloidal particles.

9. The holding material according to claim 1, wherein each said friction layer is a coating of an inorganic material on a surface said inorganic colloidal particles.

10. The holding material according to claim 1, wherein said holding material is operatively adapted for mounting a catalyst carrier inside a catalytic converter.

11. The holding material according to claim 1, wherein said holding material is operatively adapted for mounting a filter element inside a filter.

12. A pollution control apparatus comprising a casing, a pollution control element disposed inside said casing, and a holding material according to claim 1, said holding material being disposed between said casing and said pollution control element so as to mount said pollution control element inside said pollution control apparatus.

13. The pollution control apparatus according to claim 12, wherein said pollution control element is a catalyst carrier and said pollution control apparatus is a catalytic converter.

14. The pollution control apparatus according to claim 12, wherein said pollution control element is a filter element and said pollution control apparatus is an exhaust gas purification apparatus.

15. An exhaust system for an internal combustion engine comprising a pollution control apparatus according to claim 12.

16. An internal combustion engine comprising an exhaust system according to claim 15.

17. A vehicle comprising an internal combustion engine with an exhaust system according to claim 15.

18. A power generator comprising an internal combustion engine with an exhaust system according to claim 15.

19. A pollution control apparatus comprising a casing, a pollution control element disposed inside said casing; and a holding material according to claim 2, said holding material being disposed between said casing and said pollution control element so as to mount said pollution control element inside said pollution control apparatus.

20. The holding material according to claim 1, wherein said friction layer is a coating of said inorganic colloidal particles, said friction layer further comprises an organic binder added in an amount of 1/20 (weight ratio) or more to said inorganic colloidal particles, and said inorganic colloidal particles are derived from a colloidal solution comprising fine particles of at least one inorganic material selected from the group consisting of metal oxides, nitrides, and carbides, have a mean particle size of 1 to 100 nm, and are contained in an amount of 0.01 to 30 wt. % based on the total weight of said holding material.

* * * * *

UNITED STATES PATENT AND TRADEMARK OFFICE
CERTIFICATE OF CORRECTION

| | |
|---|---|
| PATENT NO. | : 7,854,905 B2 |
| APPLICATION NO. | : 12/066221 |
| DATED | : December 21, 2010 |
| INVENTOR(S) | : Daigo Yasuda |

It is certified that error appears in the above-identified patent and that said Letters Patent is hereby corrected as shown below:

Page 2, column 2, under OTHER PUBLICATIONS, delete "Fiberfax®" and insert -- Fiberfrax® --.

Column 9, line 16, delete "function" and insert -- friction --.

Column 17, line 47, delete "surface" and insert -- surface of --.

Column 18, line 30, delete "casing;" and insert -- casing, --.

Signed and Sealed this
Nineteenth Day of July, 2011

David J. Kappos
*Director of the United States Patent and Trademark Office*